United States Patent [15] 3,704,655
Fryklund et al. [45] Dec. 5, 1972

[54] PHOTOPLOTTER MECHANISM FOR PRECISE APERTURE DISC POSITIONING

[72] Inventors: Gilbert Fryklund, Winchester; Richard E. Denis, Beverly, both of Mass.

[73] Assignee: Computervision Corporation, Burlington, Mass.

[22] Filed: May 5, 1971

[21] Appl. No.: 140,428

[52] U.S. Cl. .......................... 95/12, 95/1 R, 95/4.5 R
[51] Int. Cl. .............................................. G03b 29/00
[58] Field of Search .......... 95/12, 1 R, 4.5 R; 74/815, 74/813 L

[56] References Cited

UNITED STATES PATENTS

| | | | |
|---|---|---|---|
| 3,304,847 | 2/1967 | Wilson et al. | 95/4.5 R |
| 2,985,081 | 5/1961 | Jacomelli | 95/4.5 R |
| 3,537,364 | 11/1970 | Pabst | 95/1 R |

*Primary Examiner*—Robert P. Greiner
*Attorney*—Chittick, Pfund, Birch, Samuels & Gauthier

[57] ABSTRACT

A precise positioning mechanism for positively orienting an aperture disc of a photoplotter. The mechanism inserts an index element into a ring of teeth mounted on or in cooperation with the aperture disc to angularly position the aperture disc so that the optical head axis is concentric with the indexed aperture. Also, an assembly process for mounting the aperture disc on its rotatable shaft to ensure initial radial and angular concentricity of optical head axis and apertures.

10 Claims, 3 Drawing Figures

PATENTED DEC 5 1972 3,704,655

INVENTOR
GILBERT FRYKLUND
BY Chittick, Pfund,
Birch, Samuels & Gauthier
ATTORNEYS

PHOTOPLOTTER MECHANISM FOR PRECISE APERTURE DISC POSITIONING

BACKGROUND OF THE INVENTION

This invention is employed in precision photoplotting machines which have an optical head including a light source and a lens; which have movable photographic film underlying the lens; and which have a rotatable aperture disc between the light source and lens containing a circle of apertures in which are mounted transparent images of characters and symbols. Computer instructions cause the light source to flash, the disc to rotate and the film to move, all for the purpose of creating a film plot of the desired layout. Such plots find use as artwork masters in the manufacture of printed circuits and integrated circuits.

However, it is very important that the rotatable aperture disc be precisely positioned after each disc rotation step so that the light source-lens axis is exactly aligned concentrically with the indexed aperture. To accomplish this, the aperture disc must be initially assembled with precision both angularly and radially with respect to the aperture disc index shaft. Then, after each disc rotation step, the disc must be precisely positioned and held in place by a mechanism that is quick acting, reliable and compact.

SUMMARY OF THE INVENTION

The assembly process of this invention comprises the steps of gluing the aperture disc with relation to its index shaft, optically sighting and manually aligning the apertures with the optical head axis and then permitting the glue to set.

The mechanism for precisely positioning the aperture disc after each rotation step includes a ring of teeth formed on the aperture disc or on an element which rotates with the aperture disc. After the disc stops its rotation, a solenoid-actuated index ball element is driven into engagement between the teeth and an opposed stationary index block which has a V-shaped groove. This mechanical action causes the aperture disc to assume the precise desired angular orientation so that the indexed disc aperture is positioned concentric with the optical head axis.

DESCRIPTION OF THE PREFERRED EMBODIMENT

Figure 1:
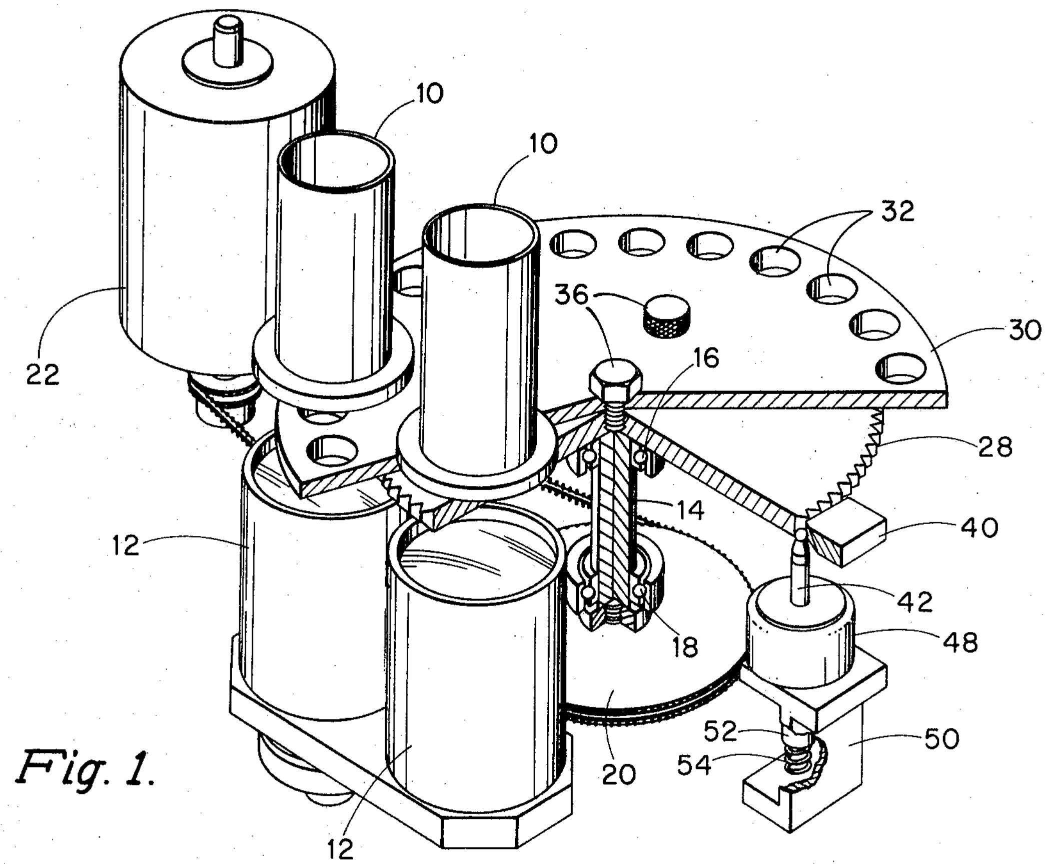
FIG. 1 is a perspective view of the preferred embodiment of this invention showing the light source, the rotatable aperture disc, the lens and the mechanism for angularly positioning the aperture disc.

FIG. 1 shows the portion of a photoplotter which is involved in this invention. The rest of the photoplotter has been removed to help simplify and clarify the description of this invention.

FIG. 1 shows a pair of light sources 10 which can be individually pulsed on for any given length of time in response to computer instructions. The light sources shine downwardly through a pair of lenses 12. This dual optical system provides considerable flexibility, can utilize more apertures, allows for use of a "zoon" or other lens, and allows for a Polaroid fifteen second quick plot. For purposes of this invention, though, it is irrelevant whether a dual or a single optical head is used.

Not shown in FIG. 1 is the film or glass plate to be exposed which is mounted below the lens 12 on a movable table that is motor driven in any horizontal direction in response to computer instructions. Also not shown in FIG. 1 is the photoplotter housing which maintains the entire photoplotter mechanism and film in darkness.

An index shaft 14 is mounted in bearings 16 and 18 and carries a large sheave 20 at its lower end. An electric open loop stepper motor 22 is adapted to turn index shaft 14. Motor 22 can provide 200 controllable steps per revolution of its own shaft and acts through an endless belt 24 to turn sheave 20 at a 4 to 1 reduction ratio. Thus, index shaft 14 can be precisely actuated to provide 800 steps per aperture disc revolution. Integrally fixed (preferably by glue) to the upper end of index shaft 14 is a mounting hub 26. As shaft 14 rotates, hub 26 rotates. Hub 26 has formed on its periphery a ring of interlocking elements in the form of teeth 28. Preferably, these teeth, in plan, are V-shaped at approximately 90° and have vertical walls. They could also take other forms or be located elsewhere. The important point is that the interlocking elements be engageable by an index element and that they rotate in precise relation with the aperture disc. Such alternative forms and locations are subsequently discussed herein.

An aperture disc 30 is mounted on and fixed to hub 26. It will be appreciated that aperture disc 30 could equally well have been mounted directly on index shaft 14 or could have employed a more complex mounting arrangement than that shown in the drawings. In any case, aperture disc 30 must rotate in response to the rotation of index shaft 14. Aperture disc 30 preferably contains approximately 96 apertures. These apertures 32 carry, for example, 32 plotting symbols for line work plus 64 characters, on transparencies. The apertures 32 can be removed and exchanged for custom work. Each aperture 32 is precisely located on disc 30 at preselected stations defined angularly and radially from the disc center. As can be seen in FIG. 1, the axis of index shaft 14 is offset from the axis of the optical head (i.e. the light source-lens axis). Therefore, the apertures 32 will rotate sequentially through the optical head axis in accordance with the computer program. When the specified aperture is in position, the stepper motor 22 stops and the light source 10 flashes to photograph the aperture image on the underlying film or glass plate which has moved to a specified location in accordance with the computer program. This operation progresses at great speed until a typical 15 × 15 inch plot is completed in approximately 25 minutes.

It is the purpose of this invention to ensure that all the apertures 32 are truly concentric with the optical head axis when the light source flashes. This is accomplished by an improved precision process for assembling the aperture disc 30 with relation to the index shaft and by an improved mechanism for precisely positioning the aperture disc 30 after it has been revolved by stepper motor 22.

The precision assembly process, of course, is performed only once for each photoplotter unless undue wear or breakage occurs. When the photoplotter is being manufactured, the mounting hub 26 and the index shaft 14 are both brushed with glue and lightly pressed into contact with each other at interface 34 (see FIG. 2). The aperture disc 30 is bolted to the hub 26 by several bolts 36 and, using a microscope, the assembler sights down the optical head axis which is the light source-lens axis. While sighting down the optical head axis, the assembler repositions the aperture disc to ensure that all the apertures align concentrically with the optical head axis. The assembler manually makes the necessary alignment adjustments and then allows the glue to set.

During the photoplotting operation, a mechanism is provided to mechanically position the aperture disc 30 to ensure aperture concentricity. On photoplotter frame 38, a stationary index block 40 is securely bolted. This stationary index block has a groove formed therein facing the ring of teeth 28 which are formed on the periphery of mounting hub 28. It will be understood that teeth 28 constitute interlocking elements which rotate in precise relation to the aperture disc 30. Although teeth 28 preferably resemble gear teeth, they could take the form of most any type of engageable element suitable to be engaged by an index element. Furthermore, although teeth 28 preferably are mounted on hub 26, they could instead be mounted directly on aperture disc 30, or index shaft 14 or on any other element which revolves in direct relation to the aperture disc 30. Index block 40 has a V-shape groove when viewed in plan from both above and below and the vertex of the V converges toward the index shaft 14 as the vertex rises vertically. The V-shaped teeth 28 are preferably the same approximate shape and size as the index block V groove when viewed in plan.

In index element 42 in the shape of a hardened ball 44 mounted on a post 46 is fixed to and extends upwardly from the upper surface of a solenoid unit which reciprocates index element 42 through a top opening in solenoid housing 48. The solenoid housing 48 is carried by a frame-mounted solenoid bracket 50 which has a downwardly extending spring cup 52 supportably retaining a coil spring 54. It will be understood that just as the interlocking elements could take various forms other than teeth, the index element could take various forms other than that of a post-mounted ball. The criterion is that the index element must be precisely engageable with the interlocking elements.

Figure 2:
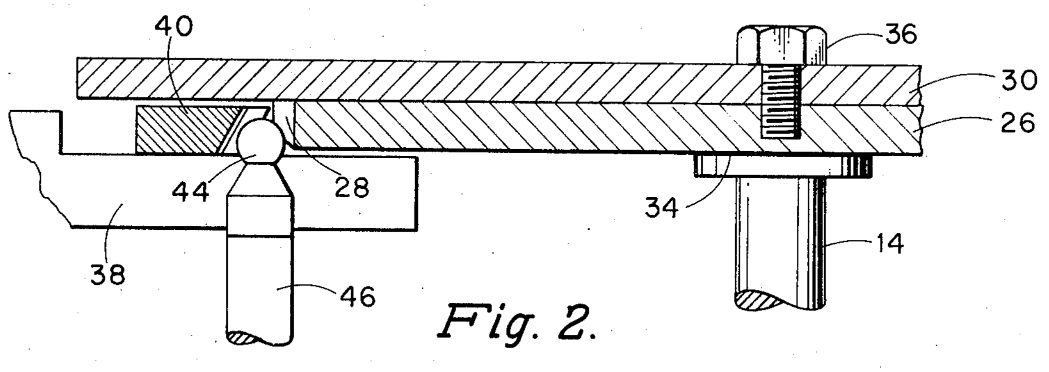
FIG. 2 is an elevation of a portion of the positioning mechanism, the index element ball being shown in operative position in engagement with both the aperture disc mounting hub teeth ring and the stationary index block.
Figure 3:
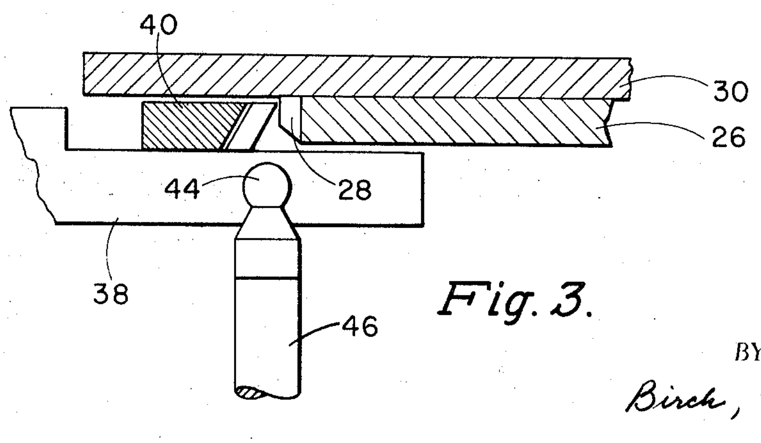
FIG. 3 is an elevation of a portion of the positioning mechanism similar to that shown in FIG. 2, the index element ball being shown in non-operative disengaged position.

To precisely position the aperture disc 30, coil spring 54 drives index element 42 upwardly, preferably at an angle slightly diverging from index shaft 14. This diverging path is preferred to ensure that ball 44 strikes the index block 40 before the ball strikes teeth 38. Thus, the dynamic load is absorbed by the stationary index block 40 rather than the relatively unsupported mounting hub 26. Post 46 is mounted in unshown bearings which permit some lateral play. Therefore, the continued upward travel of index element 42 carries ball 44 back toward index shaft 14 while the ball remains in contact with the V groove of index block 40 which upwardly converges toward index shaft 14. This converging V groove path ensures a good fit by ball 44 between the facing V grooves of teeth 28 and index block 40 as shown in FIG. 2. After the light 10 has flashed, electric means actuates the solenoid to drive index element 42 downwardly against the force of coil spring 54 until index element 42 assumes the disengaged position shown in FIG. 3. The solenoid remains in its downward actuated position until after the next aperture disc rotation. Then, the solenoid is de-activated and the coil spring 54 again drives index element 42 upwardly into engagement with teeth 28.

Other equivalent actuation means to thrust the index element 42 may be substituted for the solenoid-coil spring arrangement. For example, index element 42 could be mounted on a pivot arm or on a pneumatic or hydraulic piston. Other equivalent means suggest themselves. The important point is that means must be provided to quickly and precisely move the index element 42 into and out of engagement with teeth 28.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

We claim:

1. In a photoplotter having an optical head including a light source shining through a lens; and having a rotatable disc positioned between the light source and the lens, said disc containing a circle of spaced-apart apertures in which are mounted transparent images; and having photographic film or a glass plate mounted on a movable table positioned beneath the lens; the light source, the rotatable aperture disc and the movable table all being actuated in response to an interfaced computer to photograph the desired plot on the film or glass plate; improved precision means for angularly positioning the aperture disc relative to the optical head light source-lens axis, said precision positioning means comprising:

a. a ring of interlocking elements rotating in precise relation to the rotatable aperture disc;

b. an index element mounted adjacent to said ring periphery, said index element being controllably movable into interlocking engagement with said interlocking elements to precisely position the aperture disc in a pre-selected angular orientation, said index element being movable longitudinally at an angle to the plane of said ring of interlocking elements, and being movable laterally at a right angle to said longitudinal movement; and, c. a stationary index block located adjacent to and spaced slightly from said interlocking ring periphery, said index block having a recess formed therein having walls shaped and positioned to absorb and redirect the initial longitudinal thrust of said index element and to support and guide the subsequent lateral and longitudinal movement of said index element as it moves into engagement with said interlocking elements.

2. Apparatus of claim 1 wherein said interlocking elements are teeth.

3. Apparatus of claim 1 wherein said ring of interlocking elements is fixed to the aperture disc.

4. Apparatus of claim 1 further characterized by an index shaft to which the aperture disc is mounted for rotation therewith, and said ring of interlocking elements if fixed to said index shaft for rotation therewith.

5. Apparatus of claim 1 further characterized by a mounting hub to which the aperture disc is fixed for rotation therewith, and said interlocking elements are fixed to said mounting hub for rotation therewith.

6. Apparatus of claim 1 wherein said index element is a ball mounted at the end of a support post.

7. Apparatus of claim 6 wherein said controllably movable index element is solenoid-actuated against an opposing spring.

8. Apparatus of claim 7 wherein said index element moves into engagement with said interlocking elements by initially moving at an angle which diverges from the aperture disc plane causing said index ball to initially contact said stationary index block which absorbs the primary movement load.

9. Apparatus of claim 8 wherein said index block recess converges toward the aperture disc axis causing said index ball to movably remain in contact with said stationary index block until said index ball stops when it also contacts said interlocking elements.

10. Apparatus of claim 9 wherein said stationary index block recess is V-shaped when viewed from below.

* * * * *